(12) United States Patent
Sohma et al.

(10) Patent No.: US 8,644,621 B2
(45) Date of Patent: Feb. 4, 2014

(54) IMAGE PROCESSING APPARATUS AND IMAGE RETRIEVAL METHOD

(75) Inventors: Hidetomo Sohma, Yokohama (JP); Tomomi Takata, Yokohama (JP); Koichi Magai, Tokyo (JP); Hirotaka Shiiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1081 days.

(21) Appl. No.: 12/116,133

(22) Filed: May 6, 2008

(65) Prior Publication Data

US 2008/0304753 A1 Dec. 11, 2008

(30) Foreign Application Priority Data

May 16, 2007 (JP) .................. 2007-130900

(51) Int. Cl.
*G06K 9/68* (2006.01)
*G06K 9/46* (2006.01)
*G06K 9/54* (2006.01)
*G06F 7/00* (2006.01)

(52) U.S. Cl.
USPC ............ 382/218; 382/192; 382/305; 707/743

(58) Field of Classification Search
USPC .......................... 382/218, 192, 305; 707/743
See application file for complete search history.

(56) References Cited

U.S. PATENT DOCUMENTS

| | | | | |
|---|---|---|---|---|
| 5,444,797 A * | 8/1995 | Spitz et al. | ..................... | 382/192 |
| 5,646,741 A * | 7/1997 | Horiuchi et al. | ............. | 358/3.27 |
| 6,181,818 B1 * | 1/2001 | Sato et al. | ..................... | 382/170 |
| 6,246,804 B1 * | 6/2001 | Sato et al. | ..................... | 382/284 |
| 6,292,577 B1 * | 9/2001 | Takahashi | ..................... | 382/128 |
| 6,493,705 B1 | 12/2002 | Kobayashi et al. | ................ | 707/3 |
| 6,633,844 B1 * | 10/2003 | Verma et al. | .................. | 704/251 |
| 6,744,935 B2 * | 6/2004 | Choi et al. | ..................... | 382/305 |
| 6,751,343 B1 * | 6/2004 | Ferrell et al. | .................. | 382/145 |
| 6,754,675 B2 * | 6/2004 | Abdel-Mottaleb et al. | ............ | 1/1 |
| 6,785,427 B1 * | 8/2004 | Zhou | ............................. | 382/294 |
| 6,856,987 B2 | 2/2005 | Kobayashi et al. | ............... | 707/6 |
| 7,051,048 B2 | 5/2006 | Sohma et al. | ................. | 707/200 |
| 7,054,861 B2 | 5/2006 | Kobayashi et al. | ............... | 707/6 |

(Continued)

FOREIGN PATENT DOCUMENTS

| | | |
|---|---|---|
| JP | 06-318256 | 11/1994 |
| JP | 8137908 A | 5/1996 |

(Continued)

OTHER PUBLICATIONS

C. Harris and M. J. Stephens, "A combined corner and edge detector," in Alvey Vision Conference, pp. 147-151, 1988.

(Continued)

*Primary Examiner* — Kathleen Y Dulaney
(74) *Attorney, Agent, or Firm* — Fitzpatrick, Cella, Harper & Scinto

(57) ABSTRACT

A image processing apparatus extracts a plurality of feature points, comprising a local feature amount, from an inputted image, and a region information that relates to the feature point, identifies at least one of the plurality of feature points, associates the feature point thus identified with a feature point with a high relational degree between the feature point thus identified and a region that is denoted by the region information of the feature point thus identified, and registers the feature point thus identified and associated as an index of the inputted image.

17 Claims, 12 Drawing Sheets

IMAGE ID : 001

(56) References Cited

U.S. PATENT DOCUMENTS

| | | | | |
|---|---|---|---|---|
| 7,075,683 | B1 | 7/2006 | Shiiyama | 358/452 |
| 7,233,945 | B2 | 6/2007 | Shiiyama | 707/4 |
| 7,809,166 | B2* | 10/2010 | Funayama et al. | 382/107 |
| 7,912,321 | B1* | 3/2011 | Simonson | 382/294 |
| 2003/0179912 | A1* | 9/2003 | Murase et al. | 382/119 |
| 2005/0053282 | A1* | 3/2005 | Suen et al. | 382/182 |
| 2005/0129290 | A1* | 6/2005 | Lo et al. | 382/124 |
| 2005/0238214 | A1* | 10/2005 | Matsuda et al. | 382/124 |
| 2006/0083414 | A1* | 4/2006 | Neumann et al. | 382/125 |
| 2006/0110073 | A1 | 5/2006 | Matsushita et al. | 382/305 |
| 2006/0112088 | A1 | 5/2006 | Kobayashi et al. | 707/3 |
| 2006/0120627 | A1 | 6/2006 | Shiiyama | 382/305 |
| 2006/0122986 | A1 | 6/2006 | Sohma | 707/3 |
| 2006/0164702 | A1 | 7/2006 | Shiiyama | 358/537 |
| 2007/0036408 | A1* | 2/2007 | Kim et al. | 382/128 |
| 2007/0122037 | A1 | 5/2007 | Shiiyama | 382/190 |
| 2007/0214172 | A1* | 9/2007 | Nister et al. | 707/102 |
| 2008/0044104 | A1* | 2/2008 | Gering | 382/294 |
| 2008/0089615 | A1 | 4/2008 | Shiiyama | 382/305 |
| 2008/0095447 | A1 | 4/2008 | Fukuyama et al. | |
| 2008/0095448 | A1* | 4/2008 | Ono et al. | 382/209 |
| 2008/0131016 | A1* | 6/2008 | Kokemohr | 382/254 |
| 2009/0041340 | A1* | 2/2009 | Suzuki et al. | 382/159 |
| 2009/0167883 | A1* | 7/2009 | Nozaki | 348/222.1 |

FOREIGN PATENT DOCUMENTS

| | | |
|---|---|---|
| JP | 08-279021 | 10/1996 |
| JP | 10240765 A | 9/1998 |
| JP | 2007079616 A | 3/2007 |
| WO | 2007004520 A1 | 1/2007 |

OTHER PUBLICATIONS

J. J. Koenderink and A. J. van Doorn, "Representation of local geometry in the visual system," Biological Cybernetics, vol. 55, pp. 367-375, 1987.

U.S. Appl. No. 12/106,197 (Hirotaka Shiiyama, et al), pending.

U.S. Appl. No. 12/058,435 (Koichi Magai), pending.

Schmid C et al: "Local Grayvalue Invariants for Image Retrieval", IEEE Transactions on Pattern Analysis and Machine Intelligence, vol. 19, No. 5, May 1, 1997.

John R. Smith et al: "Integrated spatial and feature image query", Multimedia Systems, vol. 7, No. 2, Mar. 1, 1999.

Smeulders A.W.M. et al: "Content-Based Image Retrieval at the End of the Early Years", IEEE Transactions on Pattern Analysis and Machine Intelligence, vol. 22, No. 12, Dec. 1, 2000.

European Search Report dated Sep. 23, 2011 in corresponding European Application No. 08156239.9.

Office Action dated Apr. 2, 2012 in corresponding Japanese Application No. 2007-130900.

* cited by examiner

FIG. 7

| INDEX<br>(FEATURE AMOUNT TO<br>ARRAY OF FEATURE<br>AMOUNT IN<br>IMMEDIATE VICINITY) | IMAGE ID | | | | |
|---|---|---|---|---|---|
| A TO NONE | 001 | 003 | ... | | ~701 |
| ... | ... | | | | |
| B→C, A | 001 | 003 | 007 | ... | ~702 |
| ... | ... | | | | |
| C→B | 001 | 004 | ... | | ~703 |
| ... | ... | | | | |

FIG. 9

FIRST ORDER REFINEMENT
INFORMATION OF QUERY IMAGE

| INDEX INFORMATION<br>(FEATURE AMOUNT TO<br>SET OF FEATURE<br>AMOUNT OF IMMEDIATE VICINITY) |
|---|
| B→A, C     ~901 |
| C→B        ~902 |

FIG. 12

| INDEX<br>(FEATURE<br>AMOUNT TO ARRAY OF<br>FEATURE AMOUNT<br>IN IMMEDIATE VICINITY) | IMAGE ID | | | | |
|---|---|---|---|---|---|
| A→ | 001 | 003 | ... | | |
| A→B | 002 | ... | | | |
| ... | ... | | | | |
| B→C, A | 001 | 003 | ... | | ~1203 |
| B→A, C | 002 | 005 | 007 | ... | ~1204 |
| B→D, C, A | 010 | | | | |
| ... | ... | | | | |
| C→B | 001 | 003 | ... | | |
| ... | ... | | | | |

IMAGE PROCESSING APPARATUS AND IMAGE RETRIEVAL METHOD

BACKGROUND OF THE INVENTION

1. Field of the Invention

The present invention relates to an image processing apparatus and a method of retrieving an image that is similar to an inputted image.

2. Description of the Related Art

In recent times, digital cameras and digital video camcorders have made it possible to easily capture still or moving pictures, and use the still picture or moving picture thus captured as image data. Documents have also been created by utilizing such image data.

A method of searching for image data that is suited for a given usage has consequently taken on increased significance. A method exists wherein classification or description information is initially attached to the image data, and using the information thus attached to retrieve and classify the image data. It is important to comprehend a content of the image in order to automatically attach classification or description information, however, which is very difficult to implement with a typical technology that performs recognition of the content of the image, and it is common to perform the attachment of such information manually at present.

A technology is coming into use that compares a graphical feature amount that is obtained from a color, brightness, or an edge of the image data, and retrieves an image that is similar in terms of the graphical feature amount thereof. The technology employs a variety of graphical feature amounts within the image, such as the color and a position thereof within the image, a constituent and an amount of items such as a line within the image, or a shape of an object within the image. In particular, when dealing with an image that is used within a text document, however, a circumstance occurs wherein such an action is performed upon the image as an enlargement, a reduction, a rotation, a cropping, or being used as a part of another image, depending upon a size or a layout of the image. It is consequently necessary to enable the retrieval of the image even when the image is used in such an altered manner.

In particular, the image data may be used for a variety of objectives, such as simplifying a creation operation by promoting a reuse of such a image data, or performing a censorship review of a content of a document from a security standpoint. As a consequence, a calculation of the feature amount, or a degree of similarity of the feature amount, of the image has been devised so as to enable a retrieval that is robust even when such an action is performed upon the image as the enlargement, the reduction, the rotation, the cropping, or being used as the part of another image.

Japanese Patent Laid-Open No. 8-279021, for instance, discloses a technology wherein correct image retrieval is performed even if a rotation is performed upon the image. The technology divides an input image into regions of a fixed size, and calculates the graphical feature amount within the regions thus divided. The feature amount is calculated from each respective feature amount by gathering each respective feature amount in a direction of an axis of rotation, such that the rotational robustness is present, and the retrieval that is performed uses the feature amount thus calculated. While the protocol includes a robustness with regard to the enlargement or the reduction of the image, it is only effective with regard to the rotational robustness when a center of the rotation is clear.

Japanese Patent Laid-Open No. 6-318256, for instance, uses a color of a portion within the image as the graphical feature amount, in order to maintain a robustness in the retrieval. A clustering and an indexing are performed with information of a location that is based on the feature amount and a computation of the feature amount. Attempting to perform the calculation that obtains a degree of similarity with a comparatively high precision with regard to calculating the degree of similarity of the feature amount of the image increases the cost of calculating the degree of similarity thereof, and thus, a technique for reducing the volume of calculation when calculating the degree of similarity when conducting a retrieval of the image data becomes important.

A reduction of the image or a number of the feature amount of the image that is targeted for the calculation of the degree of similarity is performed by refining such that only an index of the image that is targeted for retrieval is used, and excluding the image that is targeted for retrieval that does not have a comparatively high degree of similarity from being targeted for the calculation of the degree of similarity. Such an index, which is called a first order refinement indexing, is an effective technique for improving efficiency when carrying out the retrieval. In order to create such a first order refinement indexing, it is typical to perform a calculation of, for example, the clustering of the feature amount and the location information thereof, or of a self organizing map, and to group a result thereof. The calculation of such clustering of the feature amount and the location information thereof, or of the self organizing map, however, incurs a comparatively large calculation cost, causing an increase in the calculation load or time required to register the image such that the image will be available for retrieval.

In recent times, a method has been developed that treats, as a local feature amount of the image, a point or a portion of the image wherein for example a brightness within the image undergoes a significant change, as a feature point to be extracted, and uses the feature point thus extracted in a form such as a distance or a position relationship between the feature point within the image. Using the feature amount that is thus not present in the enlargement, the reduction, or the rotation of the image facilitates using the retrieval method that includes a degree of robustness against the enlargement, the reduction, or the rotation thereof.

It is typical to facilitate obtaining a plurality of the feature points with such a method, in order to increase the precision of the retrieval. As a consequence, either the calculation that is performed when comparing the feature amount of the plurality of the feature points increases in complexity, or else the volume of the calculation becomes very large. Accordingly, the use of the first order refinement index is also proposed, in order to reduce the load of the process of calculating the degree of similarity, as well as to implement retrieval at high speed.

When creating the first order refinement index, however, the quantity of the feature points of the image is large, and thus, the load of the process of clustering of the feature point grows to a significant level.

SUMMARY OF THE INVENTION

The present invention seeks to employ retrieval index information that is created in accordance with a local feature point when registering an inputted image or when retrieving a registered image that is similar to the inputted image.

According to one aspect of the present invention, there is provided an image processing apparatus, comprises: an extraction unit configured to extract a plurality of feature points respectively having a local feature amount from an inputted image, and image region information related to the plurality of feature points; and a registration unit configured to register an association between at least one target feature point of the plurality of feature points and another one of the feature points as an index of the inputted image, if a relational degree with a region denoted by the image region information of the target feature point is above a threshold value.

According to another aspect of the present invention, there is provided an image processing method, comprises: extracting a plurality of feature points having respective local feature amounts from an inputted image, and image region information related to the plurality of feature points; and registering an association between at least one target feature point of the plurality of feature points and another one of the feature points, as an index of the inputted image, if a relational degree with a region denoted by the image region information of the target feature point is above a threshold value.

Further aspects of the present invention will become apparent from the following detailed descriptions, with reference to the attached drawings.

BRIEF DESCRIPTION OF THE DRAWINGS

FIG. 7 depicts an example of first order index information.

FIG. 9 depicts an example of first order refinement information of a query image that is obtained with a first order refinement information extraction unit 803.

FIG. 12 depicts an example of the first order refinement index according to another embodiment.

DESCRIPTION OF THE EMBODIMENTS

It is to be understood that the description according to the embodiments pertain to an image processing apparatus that employs a feature amount of a image for a large part of the image.

Figure 1:
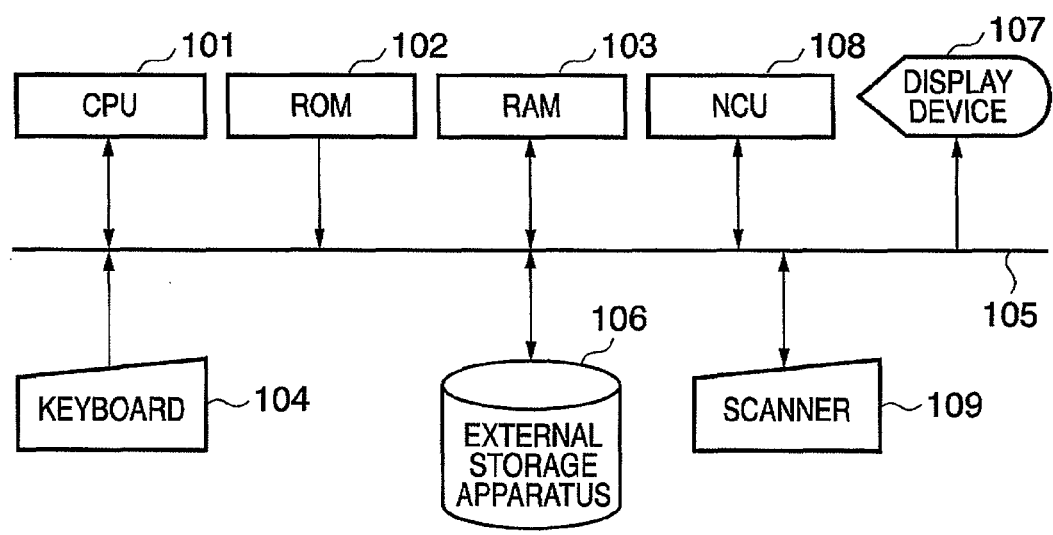
FIG. 1 depicts a conceptual configuration of a image processing apparatus according to an embodiment of the present invention.

FIG. 1 depicts a conceptual configuration of an image processing apparatus according to an embodiment. In FIG. 1, a CPU 101 executes all types of control with regard to the image processing apparatus according to the embodiment. A operation thereof is instructed by a program that is within a ROM 102 or a RAM 103 (to be described later). It is possible to cause a plurality of computer programs to be run in parallel by way of a function of the CPU proper or a mechanism of the computer program.

The ROM 102 stores the computer program or control data, a control sequence thereof is stored by the CPU 101. The RAM 103 stores a control program for processing by the CPU 101, and also provides a workspace for a variety of data when the CPU 101 executes all types of control.

A keyboard 104 comprises a text or symbol input key, such as an alphanumeric key, a hiragana key, a katakana key, or a punctuation, as well as a range of function keys, such as a cursor movement key that directs a cursor to move, thereby providing an environment for a range of input and operation by a user.

It is to be understood that the keyboard 104 may also include a pointing device such as a mouse. It would also be permissible for the keyboard 104 or the mouse to be such as a touch panel or a stylus pen, provided that such a device provides an environment for the range of input and operation by the user.

A system bus 105 is comprises an address bus or a data bus, which is connected to each unit of the image processing apparatus. An external storage apparatus 106 stores a variety of data. This may comprise a recording medium such as a hard drive, a floppy disk, an optical disc, a magnetic disk, a magneto-optical disk, a magnetic tape, or a nonvolatile memory card, as well as a drive that drives the recording medium and records the information thereupon. The computer program or the data that is stored upon the external storage apparatus is loaded into the RAM 103, either whole or in part, as needed, by an instruction from the keyboard or a command of a computer program.

A display device 107 displays each type of input operation state to the user. A telecommunications device, or NCU, 108 is a device for communicating with another computer, facilitating the image processing apparatus communicating with an apparatus that is present in a remote location (not shown) via a network, i.e., a LAN, and thereby share the program or the data according to the embodiment.

It is to be understood that it would be permissible for the telecommunications device 108 to perform wired telecommunication such as RS-232-C, USB, IEEE 1394, P1284, SCSI, a modem, or Ethernet, or a wireless telecommunication such as Bluetooth, IrDA, or IEEE 802.11b. Anything would be permissible that is capable of communicating with a device that is connected to the apparatus according to the present invention.

An image scanner 109 is a device for reading in the image, which optically reads a source manuscript that is placed thereupon, one sheet at a time, converts an image signal to a digital signal matrix, and outputs the digital signal matrix thus converted as the image data. It is possible to store the image data thus read in using the external storage apparatus 106 or the RAM 103.

It would be permissible for the image data to be inputted via an input device such as a networked scanner, a copy apparatus, a digital still camera, or a film scanner, which is connected via the telecommunications device 108, rather than the image scanner 109. It would also be permissible for the digital image data to be inputted from the external storage apparatus that maintains the digital image data, via the telecommunications device. It would further be permissible to store the image data thus read in upon an external storage apparatus such as a server or copy apparatus that is connected to the image processing apparatus via the telecommunications device, rather than in the external storage apparatus or the RAM.

The configuration thus described is an example according to the embodiment, and the present invention is not particularly restricted thereto.

The image processing apparatus according to the embodiment includes two major types of processes. One such process is a process of registering an image, wherein an image that the user wants to make into a subject for retrieval is registered, thereby making it actually possible to retrieve the image. Another such process is a process of presenting an image that a user wants to retrieve with regard to the pre-registered images (hereinafter "the query image"), performing retrieval of the image that is most similar thereto, and obtaining a retrieval result.

Image Registration Process

Figure 2:
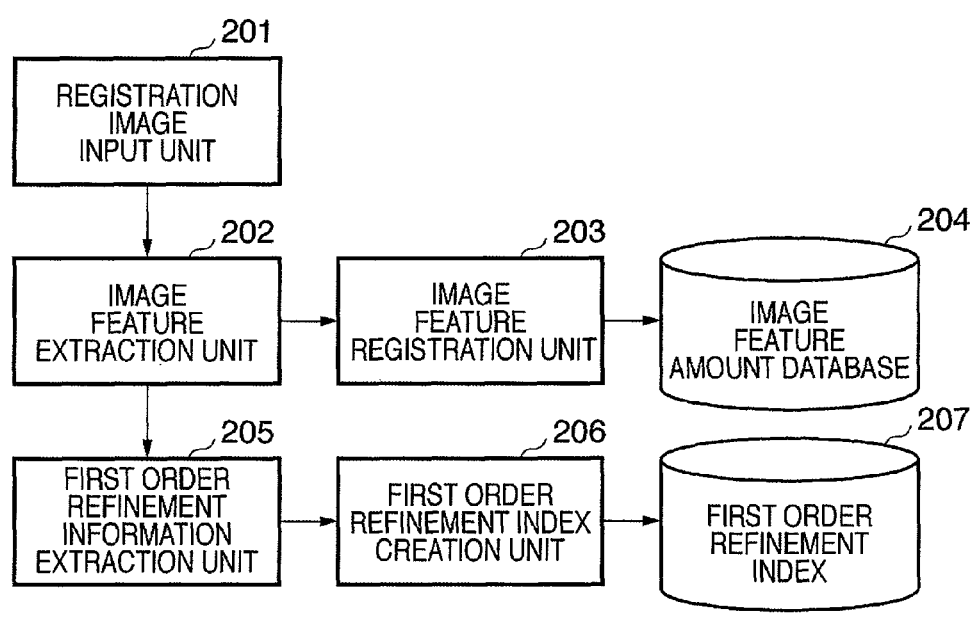
FIG. 2 is a block diagram that describes an overview of a process of registering an image according to the embodiment.

FIG. 2 is a block diagram that describes an overview of the process of registering an image according to the embodiment. In FIG. 2, a registration image input unit 201 inputs the image data to be registered via the network scanner, the digital still camera, the external storage apparatus that maintains the image data, or the image scanner 109, which is connected via the telecommunications device 108. The image data thus inputted is temporarily maintained in the RAM 103 or the external storage apparatus 106.

A image feature extraction unit 202 extracts an image feature amount by analyzing the image data that is inputted via the registration image input unit 201. As the image feature amount, information is present that denotes for example a color, a brightness, an edge, or a texture. The image feature amount thus extracted, however, uses both a local feature amount of a respective feature point, and a location and a scale of a region that is a source of the local feature amount thereof, which is extracted from one or a plurality of the feature points within the image. The scale will be depicted in detail later.

Figure 3:
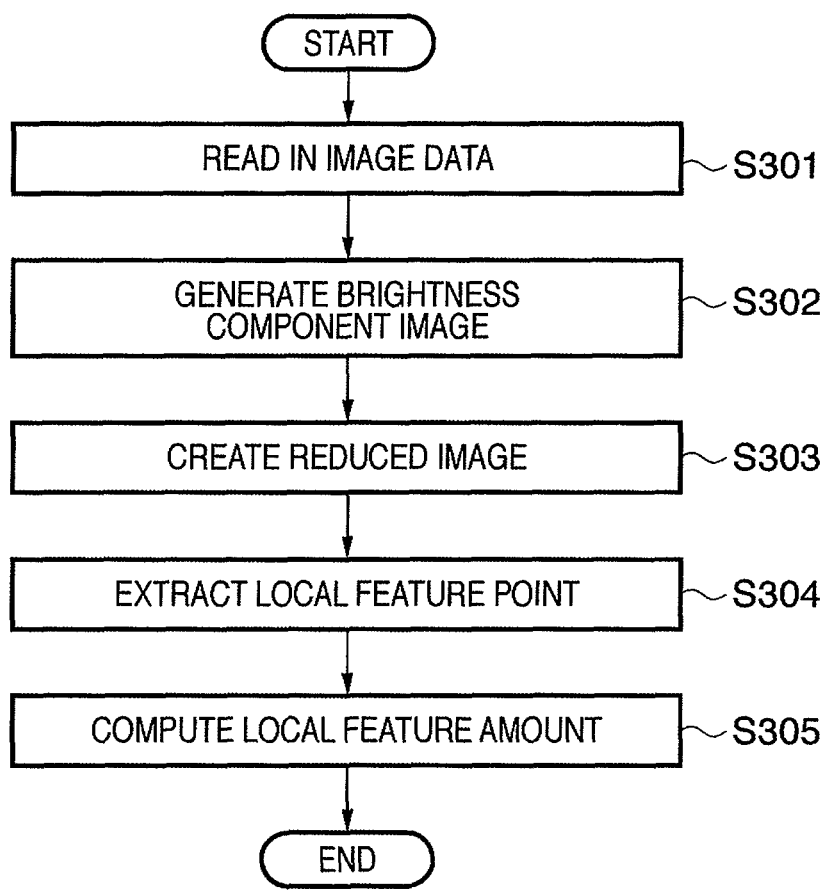
FIG. 3 is a flowchart that depicts a process that extracts a local feature amount.

FIG. 3 is a flowchart that depicts the process that extracts the local feature amount. In step S301, the image that is to be registered is read in. Put another way, the image that is inputted via the registration image input unit 201, which is depicted in FIG. 2, is read in as the registration image.

In step S302, a brightness component of the registration image that is read in step S301 is extracted and a brightness component image generated therefrom. In step S303, the brightness component image that is generated in step S302 is reduced in a sequence according to a proportion p, thus generating a number n of the reduced image. Both the proportion p and the number n of the reduced image is treated as having been predetermined.

Figure 4:
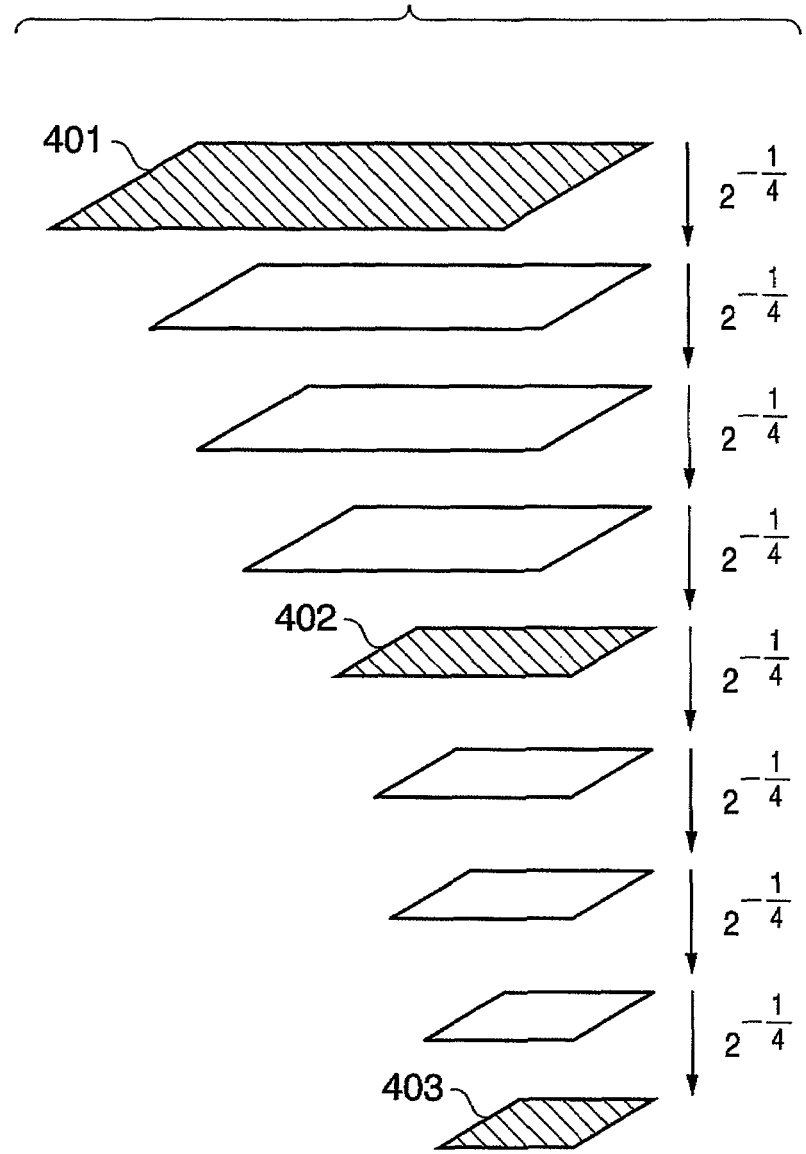
FIG. 4 depicts an example of a reduced image generation process, which generates a reduced image.

FIG. 4 depicts an example of the reduced image generation process, which generates the reduced image. The example that is depicted in FIG. 4 is the case of generating the reduced image in step S303, wherein the proportion p is 2 to the power of −¼, and the number n of the reduced image is nine. In FIG. 4, reference numeral 401 is a source brightness component image. Reference numeral 402 is the reduced image that has been reduced four times from the source brightness component image, according to the proportion p. Reference numeral 403 is the reduced image that has been reduced eight times from the source brightness component image, according to the proportion p.

In the present instance, the reduced image 402 would be the image that is reduced to one half the size of the source brightness component image, and the reduced image 403 would be the image that is reduced to one-fourth the size of the source brightness component image. It is presumed that the reduced image according to the embodiment is generated by a reduction method of a linear interpolation.

In step S304, the feature point for which the feature amount is to be calculated is extracted from each respective reduced image that is created in step S303. The feature point thus extracted is a target for the calculation of the local feature amount in step S305. In the present circumstance, a Harris operator is employed as the method of extracting the feature point according to the embodiment; for reference, refer to C. Harris and M. J. Stephens, "A combined corner and edge detector", in Alvey Vision Conference, pp. 147-151, 1988.

Specifically, the Harris operator is operated upon each respective reduced image of the number n of the reduced image, and an output image is obtained thereby. Each respective pixel in the image is checked for a pixel value of the pixel and of each of eight pixels in an immediate vicinity of the pixel, for a total of nine pixels. A pixel that becomes a local maximum, i.e., wherein the pixel value of the pixel becomes a largest value among the nine pixels, is extracted as the feature point. In the present circumstance, the pixel is not extracted as the feature point, even if the pixel is the local maximum, when the value of the pixel is less than or equal to a threshold value. It is thus possible to extract a component of a feature point wherein the brightness thereof is comparatively large as the feature point. It is to be understood that the pixel value in the present example refers to a fixed value that each respective pixel incorporates, such as a brightness value or a color value of each respective pixel.

In the present embodiment, each respective feature point incorporates two pieces of information, a location and a scale, because the local feature point is obtained for each respective reduced image of the number n of the reduced image. In the present circumstance, "location" refers to a location within the image where the local maximum is located. "Scale" refers to a value that denotes a comparative size, i.e., a rate of reduction, of an image region that is a source of the feature point, for instance, a reciprocal of the proportion p for the source image of the reduced image. It would be permissible instead to employ such as a radius of curvature with regard to the feature point that incorporates the feature amount of an edge of a curve location. In addition, when repeatedly applying a given reduction, such as is depicted in FIG. 4, it would be permissible to treat a number of times that the given reduction is applied until the reduced image is obtained as the scale value. Any form of representation is allowable as the scale, provided that the value thus represented corresponds to the rate of reduction of the source image to the reduced image.

In step S305, the computation of the local feature amount is performed. In the present circumstance, a combination of a Local Jet and a derivative thereof is employed as the method of computing the local feature amount according to the embodiment; for reference, refer to J. J. Koenderink and A. J. van Doorn, "Representation of local geometry in the visual system", Biological Cybernetics, vol. 55, pp. 367-375, 1987.

The local feature amount that is computed by the present method incorporates a degree of robustness with regard to the enlargement, the reduction, or the rotation of the image. Specifically, the local feature amount is computed as depicted in equation (1):

$$v = \begin{pmatrix} L \\ L_x L_x + L_y L_y \\ L_{xx} L_x L_x + 2 L_{xy} L_x L_y + L_{yy} L_y L_y \\ L_{xx} + L_{yy} \\ L_{xx} L_{xx} + 2 L_{xy} L_{xy} + L_{yy} L_{yy} \end{pmatrix} \quad (1)$$

It is to be understood that the notation that is employed at the right hand side of the equation (1) is defined by the equations (2) through (7), provided below. In the present circumstance, the notation G(x, y) at the right hand side of the equation (2) is a Gaussian function, the notation I(x, y) at the right hand side of the equation (2) is the pixel value at the coordinate (x, y) of the image, and "*" is a symbol that represents a convolution computation. Equation (3) is a partial derivative relating to a variable $L_x$ that is defined in equation (2), and equation (4) is a partial derivative relating to a variable Ly that is defined in equation (2). Equation (5) is a partial derivative relating to a variable $L_{xy}$ that is defined in equation (3), equation (6) is a partial derivative relating to a variable $L_{xx}$ that is defined in equation (3), and equation (7) is a partial derivative relating to a variable $L_{yy}$ that is defined in equation (4).

$$L = G(x, y) * I(x, y) \quad (2)$$

$$L_x = \frac{\partial L}{\partial x} \quad (3)$$

$$L_y = \frac{\partial L}{\partial y} \quad (4)$$

$$L_{xy} = \frac{\partial^2 L}{\partial x \partial y} \quad (5)$$

$$L_{xx} = \frac{\partial^2 L}{\partial x^2} \quad (6)$$

$$L_{yy} = \frac{\partial^2 L}{\partial y^2} \quad (7)$$

It is to be understood that a method that is capable of computing the local feature amount is not restricted to a method of computing the local feature amount such as described above, and it would be possible to apply any such method of computing the local feature amount.

The process of extracting the local feature amount of the image feature amount registration unit is thereby completed.

It is to be understood that the feature point and the feature amount of the image incorporate the scale that is the information that relates to the relative size of the region that is the source of the feature point, which provides a robustness with regard to processes such as the enlargement, the reduction, or the rotation of the image, thereby facilitating carrying out a stable retrieval thereof.

If a more complex calculation is performed with regard to the extraction of the feature point, and the computation of the feature amount, of the image, as compared with the conventional feature amount of the image, the scale is also obtained thereby with regard to the feature point and the feature amount. If such information is present when performing the retrieval of the image, it is possible to employ such information to easily create a first order refinement index, i.e., retrieval index information, for reducing the retrieval process. As a consequence, high-speed retrieval of the image, or a high-speed registration of the image, that does not cause a reduction in the precision of the retrieval when the image is retrieved, becomes possible. A detailed description of a process of creating the first order refinement index, i.e., the retrieval index information, will be provided later.

If the feature point and the feature amount of the image whereto the present invention may be applied incorporate the information that relates to the relative size of the region that is the source of the feature point, any technique may be used thereupon. It would also be permissible for the information that relates to the relative size of the region that is the source of the feature point to be computed either when the feature point is extracted, or when the feature amount is computed.

The feature amount of the image with regard to the image feature extraction unit 202 that is depicted in FIG. 2 is thereby extracted in such a manner.

In FIG. 2, an image feature registration unit 203 performs a process that registers the image feature amount that is extracted by the image feature extraction unit 202 in a image feature amount database 204, together with (for example) an image ID for identifying the image that is registered. Whereas the image feature amount database 204 is stored in the external storage apparatus 106 in the present circumstance, it would be permissible for the image feature amount database 204 to be stored upon the external storage apparatus of the server or the copy apparatus that is connected to the image processing apparatus via the telecommunications device 108.

Normally in order to perform a retrieval of an image from a large quantity of images, and to shorten a processing time when performing the retrieval thereof, a technique is used when performing the process of registering the image of extracting the feature amount of the image that is targeted for the retrieval, and registering the feature amount thus extracted in a database, prior to performing the retrieval. The technique makes it unnecessary to extract the feature amount from the image that is targeted for the retrieval at the time that the retrieval is to be performed, allowing the time taken for the performing of the retrieval to be shortened by a comparable amount, making such preprocessing a desirable process when a large volume of images is targeted for the retrieval.

Furthermore, a technique is employed of creating an index for a first order refinement from the feature amount of the image when the feature of the image is extracted, when performing the process of registering the image, in order to implement the high speed image retrieval. The reason is to avoid comparing the feature amount of the query image for all of the feature amount of the image that is targeted for retrieval, when retrieving the image, because the calculation load is large when comparing the feature amount of the registered image with the feature amount of the query image and performing the calculation of the degree of similarity thereof. A detailed description of the calculation of the degree of similarity will be provided hereinafter.

A first order refinement information extraction unit 205 extracts information for performing a registration in an index that is employed in performing the first order refinement, or for performing the first order refinement at the time of the retrieval, in accordance with the information of the feature point and the feature amount of the image that is extracted by the image feature extraction unit 202. Whereas, normally, information such as the location relationship of the feature point is employed in performing the clustering calculation, for example, the first order refinement information extraction unit 205 uses the scale, which is the information that relates to the relative size of the region that is the source of the feature point that is extracted by the image feature extraction unit 202. It is thus possible to create information for a refinement index by determining a point that is in an immediate vicinity of each respective feature point, i.e., wherein a range of the immediate vicinity is determined in accordance with a size of the scale. Put another way, a calculation such as a clustering is performed because the value that corresponds to the scale is unknown, and the calculation load thereof is very large compared with the method according to the present invention.

Figure 5:
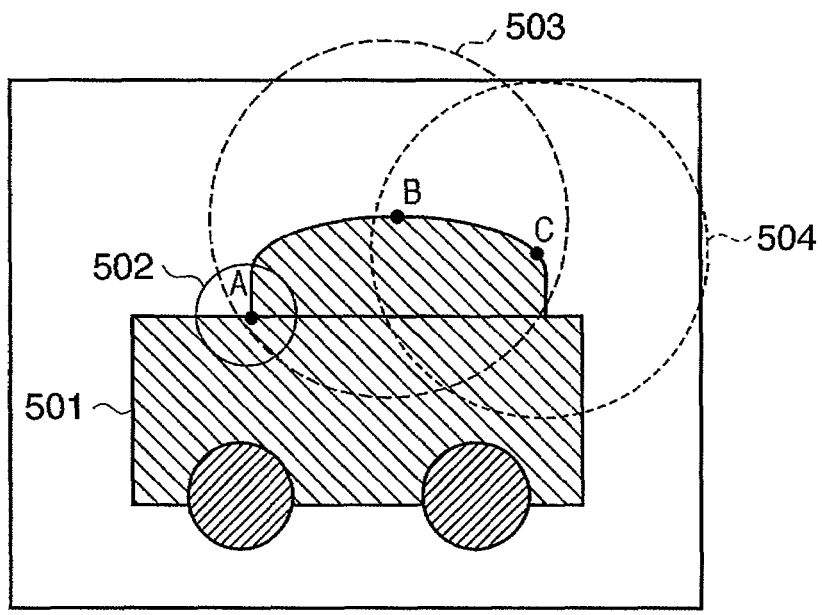
FIG. 5 depicts an example of the creation of refinement index information according to the embodiment.

Following is a description of an example of the creation of the refinement index information that employs the scale, with reference to FIG. 5. FIG. 5 depicts an example of the creation of the refinement index information according to the embodiment. In FIG. 5, reference numeral 501 is a picture of an automobile, and it is presumed that "001" is allocated to the image as an image ID of the image. Whereas performing the calculation according to the embodiment results in many feature points being extracted with regard to the picture 501, it would be hard to understand when using such a case history as the present instance, and thus, in the present circumstance, the description will consider three feature points A, B, and C as a representative example, from among the variety of points that are extracted as the feature points herein.

Reference numeral 502 is a circular region, centered on the feature point A, and with a radius that is computed from a scale of the feature point A, reference numeral 503 is a circular region with regard to the feature point B, and reference numeral 504 is a circular region with regard to the feature point C. Whereas it is presumed in the present circumstance that the scale is multiplied by a constant M in order to calculate the radius of the circular region from each respective feature point, any method that calculates the radius of the circular region in accordance with the scale would be acceptable as well.

As per the depiction in FIG. 5, the circular region 502 does not include the feature point aside from the feature point A, and an element of a set of the feature amount that is in the immediate vicinity of the feature amount of the feature point A is "none". The circular region 503 includes the feature point A and the feature point C, in addition to the feature point B, and the element of the set of the feature amount that is in the immediate vicinity of the feature amount of the feature point B is "the feature amount of the feature point A and the feature amount of the feature point C". In a similar manner, the circular region 504 includes the feature point B, in addition to the feature point C, and the element of the set of the feature amount that is in the immediate vicinity of the feature amount of the feature point C is "the feature amount of the feature point B". Thus, information with regard to each respective feature point as to which of the feature point is included within the immediate vicinity, i.e., the circle, of the range that is specified by using the scale is the first order refinement information that the first order refinement information extraction unit 205 that is depicted in FIG. 2 extracts with regard to the image that is tagged with ID: 001 that is depicted in FIG. 5.

With regard to a candidate of the image that will be a target of the calculation of the degree of similarity at the time of the retrieval, the first order refinement at the time of the retrieval is configured such that a candidate that incorporates a necessary degree of similarity must be included within the first order refinement, and that a candidate that does not incorporate the necessary degree of similarity must be excluded from the first order refinement as much as possible. Put another way, an aim herein is to perform the calculation of the degree of similarity with either a smaller calculation load, or at a higher speed, than is possible with the conventional technology.

If the value of M with regard to the calculation of the scale is set to a significantly large value, the refinement of the image that will be a target of the retrieval in the first order refinement at the time of the retrieval will not operate effectively. Such a failure to operate effectively will cause a reduction in the speed at the time of the retrieval. Conversely, if the value of M is set to a significantly small value, the refinement of the image that will be a target of the retrieval will be excessively sensitive, causing the precision of the retrieval result to the necessary retrieval result candidate to decline. Accordingly, it is necessary to adjust the value of M to a suitable degree prior to performing the calculation of the scale thereof.

Returning to FIG. 2, reference numeral 206 is a first order refinement index creation unit, which performs a process of recording the information that is extracted by the first order refinement information extraction unit 205 into a first order refinement index 207. While the first order refinement index is stored in the external storage apparatus 106, it would be permissible for the first order refinement index to be stored upon the external storage apparatus of the server or the copy apparatus that is connected to the image processing apparatus via the telecommunications device 108.

A description of an example of the first order refinement index that is actually stored, with reference to FIG. 7, will now be provided. Normally, the image feature amount database 204 takes on a form wherein the feature amount is associated with the specified image ID. The first order refinement index, however, is a retrieval index, and is transposed thereby, and an exemplary index is depicted in FIG. 7 is the information that relates to an immediate vicinity location of the feature amount, and the image ID is associated that maintains the relationship of the feature point thereof.

The process of registering the image that is targeted for the retrieval is thereby performed.

Image Retrieval Process

Figure 8:
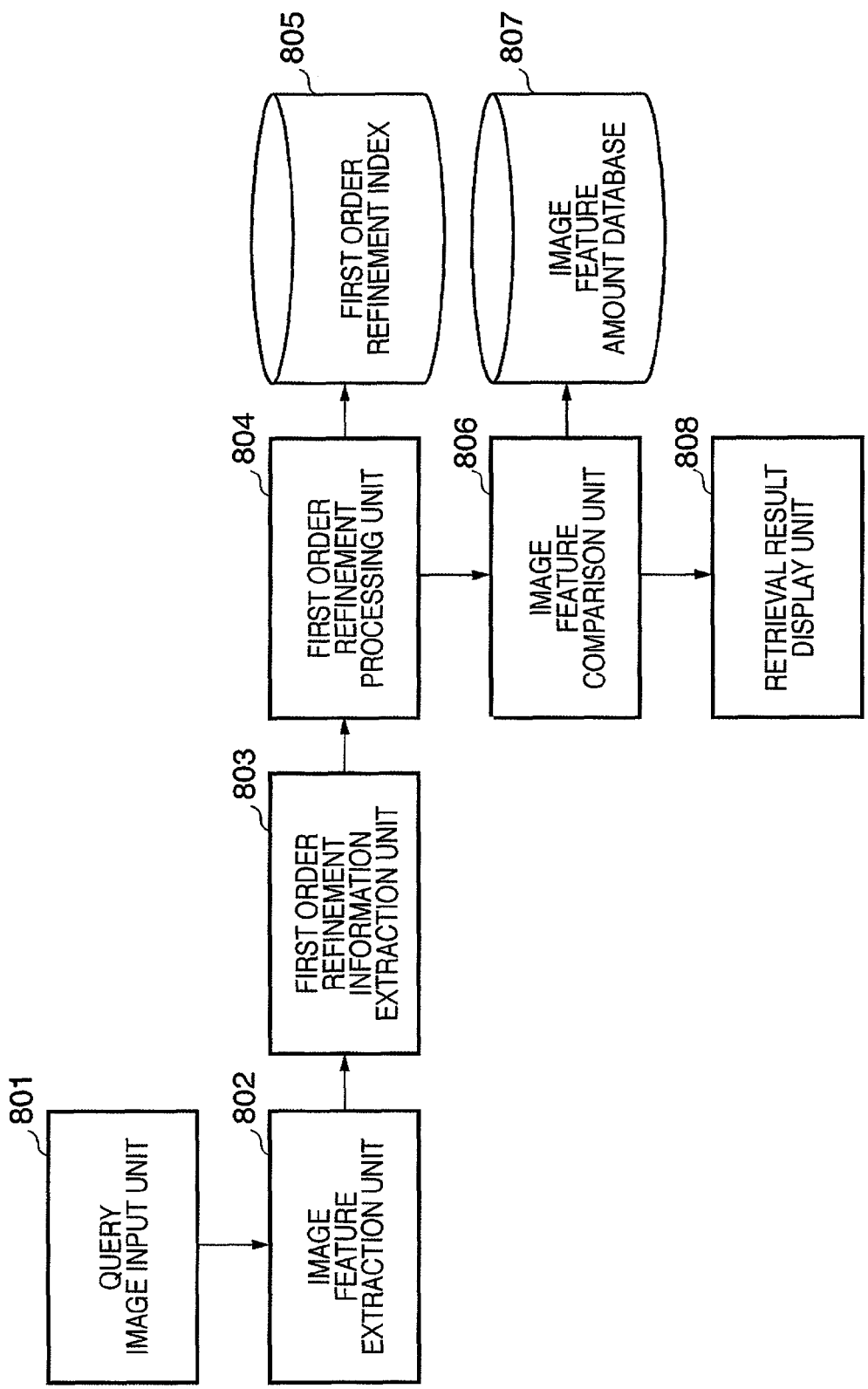
FIG. 8 is a block diagram that describes an overview of a process of retrieving an image according to the embodiment.

Following is a description of an overview of a process for the retrieval of the registered image from the query image, with reference to FIG. 8. FIG. 8 is a block diagram that provides an overview of the process of retrieving the image according to the embodiment. In FIG. 8, a query image input unit 801 inputs the image data that is a source of the retrieval via the network scanner, the digital still camera, the external storage apparatus that maintains the image data, or the image scanner 109, which is connected via the telecommunications device 108. The image data thus inputted is treated as a retrieval query image. The image data thus inputted is temporarily maintained in the RAM 103 or the external storage apparatus 106.

A image feature extraction unit 802 performs the same process as the image feature extraction unit 202 that is depicted in FIG. 2, except for the image that is targeted for processing being the query image that is obtained via the query image input unit 801, and the feature amount thus obtained being used in the retrieval, and thus, a description thereof will be omitted.

A first order refinement information extraction unit 803 performs the same process as the first order refinement information extraction unit 205 that is depicted in FIG. 2, except for the feature amount that is targeted for processing being the feature amount of the query image that is obtained via the image feature extraction unit 802, and the first order refinement information thus obtained being used in the retrieval, and thus, a description thereof will be omitted.

A first order refinement index 805 is the same as the first order refinement index 207 that is depicted in FIG. 2, and thus, a description thereof will be omitted. A image feature amount database 807 is the same as the image feature amount database 204 that is depicted in FIG. 2, and thus, a description thereof will be omitted.

A first order refinement processing unit 804 searches the first order information that is extracted by the first order refinement information extraction unit 803 from the first order refinement index 805. The process is simple index retrieval, and as such, is performed at a high speed. The process is performed at a comparatively high speed when compared with, for example, a calculation of the degree of similarity of the image feature amount (to be described hereinafter).

An instance of the first order refinement information of the query image that is obtained with the first order refinement information extraction unit 803 is depicted in FIG. 9. A description now follows of the process wherein the first order refinement index 701-703 that is depicted in FIG. 7 performs the retrieval with regard to the first order refinement index 805 when index information of the query image that is depicted in FIG. 9 is obtained.

An index component of the first order refinement index is predicated upon being used as a key in processing the retrieval, and thus, it is possible to obtain a storage location of the information at a high speed, by applying a calculation protocol to the index component thereof, such as the well-known hash function or the B-tree protocol. It is thus possible to find, at a high speed, the set of the image ID that corresponds to the index information when the index information is designated, and to depict the set thereof as a retrieval result.

The index information of reference numeral 901 and 902 that are depicted in FIG. 9 are presented, the corresponding reference numeral 702 and 703 are chosen, each respective set of the image ID is extracted, a set product is calculated, and the set of the image ID is obtained as a result thereof. In the circumstance of the present instance, the image ID: 001 is thus obtained. The process of the first order refinement is performed by way of such a calculation. The process is made simpler than a comparable calculation of the degree of similarity of the feature amount of the image (to be described hereinafter), with only a very simple calculation, and thus, has a comparatively smaller processing load and a higher speed.

The value of the scale of the feature amount of the image is used to create the first order refinement index prior to actual use, such that a suitable refinement is obtained. Thus, when calculating the degree of similarity of the feature amount of the image, the candidate of the image to be targeted for the retrieval that is only capable of yielding a sufficiently low degree of similarity is excluded in the first order refinement from the candidate of the image to be targeted for the retrieval.

It is to be understood that the result of the first order refinement is temporarily maintained in a storage means such as the RAM 103 or the external storage apparatus 106.

Returning to FIG. 8, reference numeral 806 is a image feature comparison unit, wherein the local feature amount that corresponds to each respective image ID of each respective candidate image, with regard to the candidate of the image of the retrieval result that is refined in the first order refinement processing unit, is acquired from the image feature amount database 807. The local feature amount thus acquired is compared with the local feature amount of the query image that is extracted via the image feature extraction unit 802, and the degree of similarity thereof is calculated. A protocol for calculating the degree of similarity thereof will be described hereinafter. Performing the calculation of the degree of similarity for each respective candidate image creates an information of a combination of the degree of similarity between the candidate image and the query image for only as many entries as the number of the candidate images temporarily maintained in the storage means.

Method of Computing the Degree of Similarity

A method of computing the degree of similarity according to the embodiment is now described with reference to FIG. 6. In the present example, it is presumed that the feature amount of the query image is Vs, and a location coordinate of the feature point associated with the feature amount is S(x, y). It is also presumed that the feature amount that is present with regard to a candidate image R that is registered with the image feature amount database 807 is Vq, and a location coordinate of the feature point feature is Q(x, Y).

Figure 6:
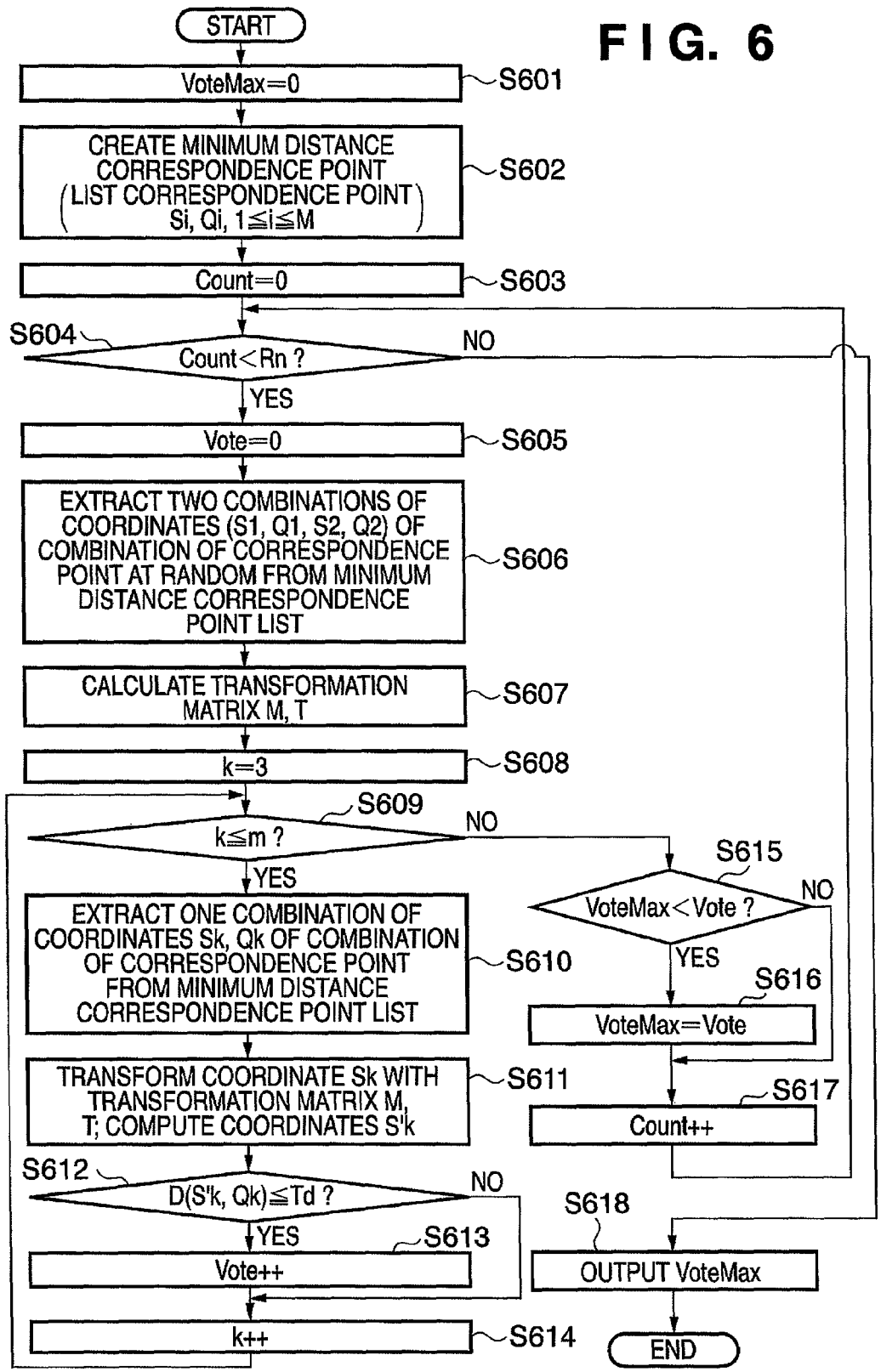
FIG. 6 is a flowchart that depicts a process of computing a degree of similarity according to the embodiment.

FIG. 6 is a flowchart that depicts the process of computing the degree of similarity according to the embodiment. The computation of the degree of similarity is performed by a vote process, i.e., a counting process. When it is determined at each respective calculation that a similarity exists, a vote is performed, and a final degree of similarity is treated as an aggregate result of the vote that is performed thereupon. In step S601, a variable VoteMax that represents a maximum number of votes is initialized to zero. The maximum number of votes is a maximum number of votes that is obtained when performing a plurality of votes. In step S602, a feature amount distance is calculated between the Vq and the Vs for all combinations thereof, and a minimum distance correspondence point list is created therefrom.

Put another way, the combination between the Vq and the Vs wherein the distance between the feature amount thus calculated is less than or equal to a threshold Tv and that is the minimum distance therebetween, is extracted and registered with the minimum distance correspondence point list.

The local feature point of a kth correspondence point that is registered with the minimum distance correspondence point list will be respectively denoted as Vq(k) and Vs(k). The feature point that is associated with the Vq(k) and the Vs(k) will be respectively denoted as Qk and Sk, and the coordinate thereof will be expressed as Qk(x' k, y k) and Sk(xk, yk). The number of the combinations of the correspondence point that is registered with the minimum distance correspondence point list that is created in step S602 will be treated as m combinations.

In step S603, a variable Count that represents an iteration count of the process of computing the degree of similarity is initialized to zero. In step S604, a determination is made as to whether or not the iteration count number Count exceeds a predetermined maximum number of the iteration process Rn. In the present circumstance, if the iteration count number Count exceeds the predetermined maximum number of the iteration process Rn, the process proceeds to step S618, wherein the maximum number of votes VoteMax is outputted, and the process terminates.

If the iteration count number Count does not exceed the predetermined maximum number of the iteration process Rn in step S604, the process proceeds to step S605, wherein a variable Vote that represents a number of votes is initialized to zero. In step S606, two combinations of the coordinates of the combination of the correspondence point are extracted at random from the minimum distance correspondence point list. In the present example, the coordinate is disclosed as Q1(x'1, y'1), S1(x1, y1), and Q2 (x'2), y'2), S2 (x2, y2). In step S607, it is postulated that the Q1(x'1, y'1), S1 (x1, y1), and the Q2 (x'2), y'2), S2 (x2, y2) thus extracted satisfy a transformation that is depicted in the equation (8), shown below, and a variable a to f within the equation (8) is derived thereby.

In step S607 that is depicted in FIG. 6, a matrix that is configured of the variable a to d is depicted as M, and a matrix that is configured of the variable e to f is depicted as T.

$$\begin{pmatrix} x'_k \\ y'_k \end{pmatrix} = \begin{pmatrix} a & b \\ c & d \end{pmatrix}\begin{pmatrix} x_k \\ y_k \end{pmatrix} + \begin{pmatrix} e \\ f \end{pmatrix} \qquad (8)$$

In the present example, according to the first embodiment, only a similarity transformation will be considered, for purposes of simplification herein. In such a case, it is possible to rewrite the equation (8) as the equation (9):

$$\begin{pmatrix} x'_k \\ y'_k \end{pmatrix} = \begin{pmatrix} a & -b \\ b & a \end{pmatrix} \begin{pmatrix} x_k \\ y_k \end{pmatrix} + \begin{pmatrix} e \\ f \end{pmatrix} \quad (9)$$

In such a circumstance, the variables a, b and e are represented by the equations (1) to (13), shown below, using x'1, y'1, x1, y1, x'2, y'2, x2, and y2:

$$a = \frac{(x_1 - x_2)(x'_1 - x'_2) + (y_1 - y_2)(y'_1 - y'_2)}{(x_1 - x_2)^2 + (y_1 - y_2)^2} \quad (10)$$

$$b = \frac{(x_1 - x_2)(y'_1 - y'_2) - (y_1 - y_2)(x'_1 - x'_2)}{(x_1 + x_2)^2 + (y_1 - y_2)^2} \quad (11)$$

$$e = \frac{(y'_1 - y'_2)(x_1 y_2 - x_2 y_1) - (x'_1 + x'_2)(x_1 x_2 + y_1 y_2) + x'_1(x_2^2 + y_2^2) + x'_2(x_1^2 + y_1^2)}{(x_1 - x_2)^2 + (y_1 - y_2)^2} \quad (12)$$

$$f = \frac{(x'_1 - x'_2)(y_1 x_2 - y_2 x_1) - (y'_1 + y'_2)(y_1 y_2 + x_1 x_2) + y'_1(y_2^2 + x_2^2) + y'_2(y_1^2 + x_1^2)}{(x_1 - x_2)^2 + (y_1 - y_2)^2} \quad (13)$$

In step S608, a correspondence point selection variable k is initialized to three, in order to select a point other than the two combinations of points that is extracted at random from the minimum distance correspondence point list in step S606. In step S609, a determination is made as to whether or not the correspondence point selection variable k exceeds the number of the combinations of the correspondence point that is registered with the minimum distance correspondence point list m. In the present circumstance, if the correspondence point selection variable k exceeds the number of the combinations of the correspondence point that is registered with the minimum distance correspondence point list m, the process proceeds to step S615 (to be described later). If the correspondence point selection variable k does not exceed the number of the combinations of the correspondence point that is registered with the minimum distance correspondence point list m in the determination that is performed in step S609, the process proceeds to step S610.

In step S610, a point other than the two combinations of points S1(x1, y1) and S2(x2, y2) that is extracted at random from the minimum distance correspondence point list in step S606 is extracted from the minimum distance correspondence point list. The point thus extracted is denoted as Sk(xk, yk) according to the first embodiment.

In step S611, the Sk(xk, yk) derives the transformed coordinate Sk' (x'k, y'k) via equation (9).

In step S612, a geometric distance between the coordinate Sk' (x'k, y'k) and the coordinate Qk(x'k, y'k) is calculated as a Euclidean distance, and determination is made as to whether or not the Euclidean distance is less than or equal to a threshold Td. If the Euclidean distance is less than or equal to the threshold Td, the process proceeds to step S613, wherein a similar candidate is treated as having been found, the vote number Vote is incremented, and the process proceeds to step S614. If the Euclidean distance is greater than the threshold Td, the similar candidate is treated as not having been found, and the process proceeds to step S614, with no incrementing of Vote being performed.

In step S614, the correspondence point selection variable k is incremented and the process returns to step S609, wherein the preceding process is repeated until the correspondence point selection variable k exceeds the number of the combinations of the correspondence point that is registered with the minimum distance correspondence point list m. Put another way, what is repeated is that another pair of combinations is extracted in step S606, the parameter variable a, b, e, and f on the equation (9) is derived in step S607, the process from step S608 to step S612 is performed, and the vote is made.

Step S615 will now be described, i.e. the process that is performed when the correspondence point selection variable k exceeds the number of the combinations of the correspondence point that is registered with the minimum distance correspondence point list m in step S609. In step S615, the value of the vote number Vote is compared with the value of the maximum vote number VoteMax, and if the value of the vote number Vote is greater than the value of the maximum vote number VoteMax, the process proceeds to step S616.

In step S616, the value of the maximum vote number VoteMax is replaced with the value of the vote number Vote, whereupon the iteration count number Count is incremented in step S617, and the process returns to step S604.

If the value of the vote number Vote is less than or equal to the value of the maximum vote number VoteMax in step S615, the process proceeds to step S617, wherein the iteration count number Count is incremented, and the process returns to step S604.

By performing such a process as described herein, a vote is cast as to whether or not the feature point of the query image and of each individual candidate image wherein the feature amount is close thereto is capable of maintaining the close state even with regard to a location relationship within both the query image and each individual candidate image of the feature point thereof. An aggregated result of each individual vote thus cast is treated as the degree of similarity between the query image and each individual candidate image. The degree of similarity between the query image and each individual candidate image is thus calculated.

Returning to FIG. 8, reference numeral 808 is a retrieval result display unit, which displays the image of the retrieval result that is obtained with the image feature comparison unit 806, the degree of similarity, and a property information of the retrieved image.

Whereas the description of the method of computing the degree of similarity according to the embodiment considers only the similarity transformation, it is possible to respond to another geometric transformation, such as an affine transformation, by deriving the transformation matrix that corresponds respectively thereto in step S607. With the affine transformation, for instance, the number of coordinates of the combination of the feature point that is selected at random is treated as three. It would then be permissible to presume that the equation (8), rather than the equation (9), is used in step S607, and to use the three combinations of the feature point, i.e., a total of six of the feature point, that were selected in step S606 to derive the variable a to f therein.

Figure 10:
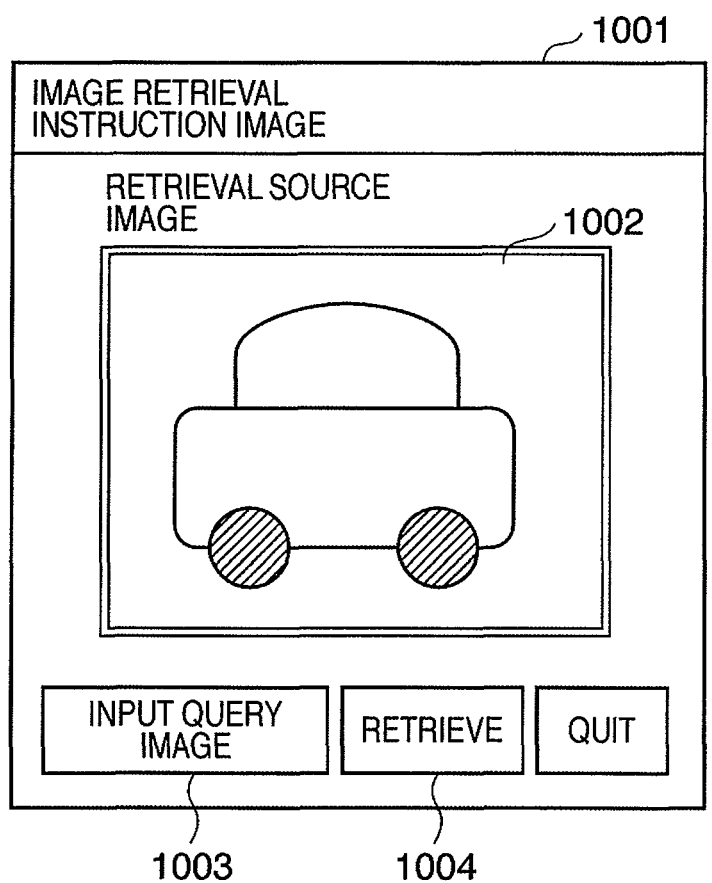
FIG. 10 depicts an example of an image retrieval support screen that is displayed when inputting a retrieval query image according to the embodiment.

FIG. 10 depicts an example of an image retrieval support screen that is displayed when inputting the retrieval query image according to the embodiment. The screen is displayed by the query image input unit 801. Although FIG. 10 is an example of a screen of a dedicated application that uses a windowing system, a similar function can be provided by a Web browser, for example.

In FIG. 10, reference numeral 1001 is a title bar, which is a component that performs a display of a title of the screen and an overall operation of the screen, such as a change in a size of the screen. Reference numeral 1003 is a button that controls input the query image that is being used in the retrieval. Depressing the button 1003 causes a screen to be displayed for controlling a scanner, a digital still camera, or an external storage apparatus, which is connected via the telecommunications device 108. It thus becomes possible to input the query image, and the process of inputting the query image is performed with the query image input unit 801.

Reference numeral 1002 is a retrieval source image display component, which displays a thumbnail image of the retrieval source query image that is inputted. Reference numeral 1004 is a button for requesting retrieval of the image that is similar to the query image that is displayed in the retrieval source image display component 1002. In the present example, when the button 1004 is depressed, the process of retrieving the image is performed by the image feature extraction unit 802 and the subsequent component thereafter, with the result of the retrieval thereof being displayed in a screen depicted in FIG. 11.

Figure 11:
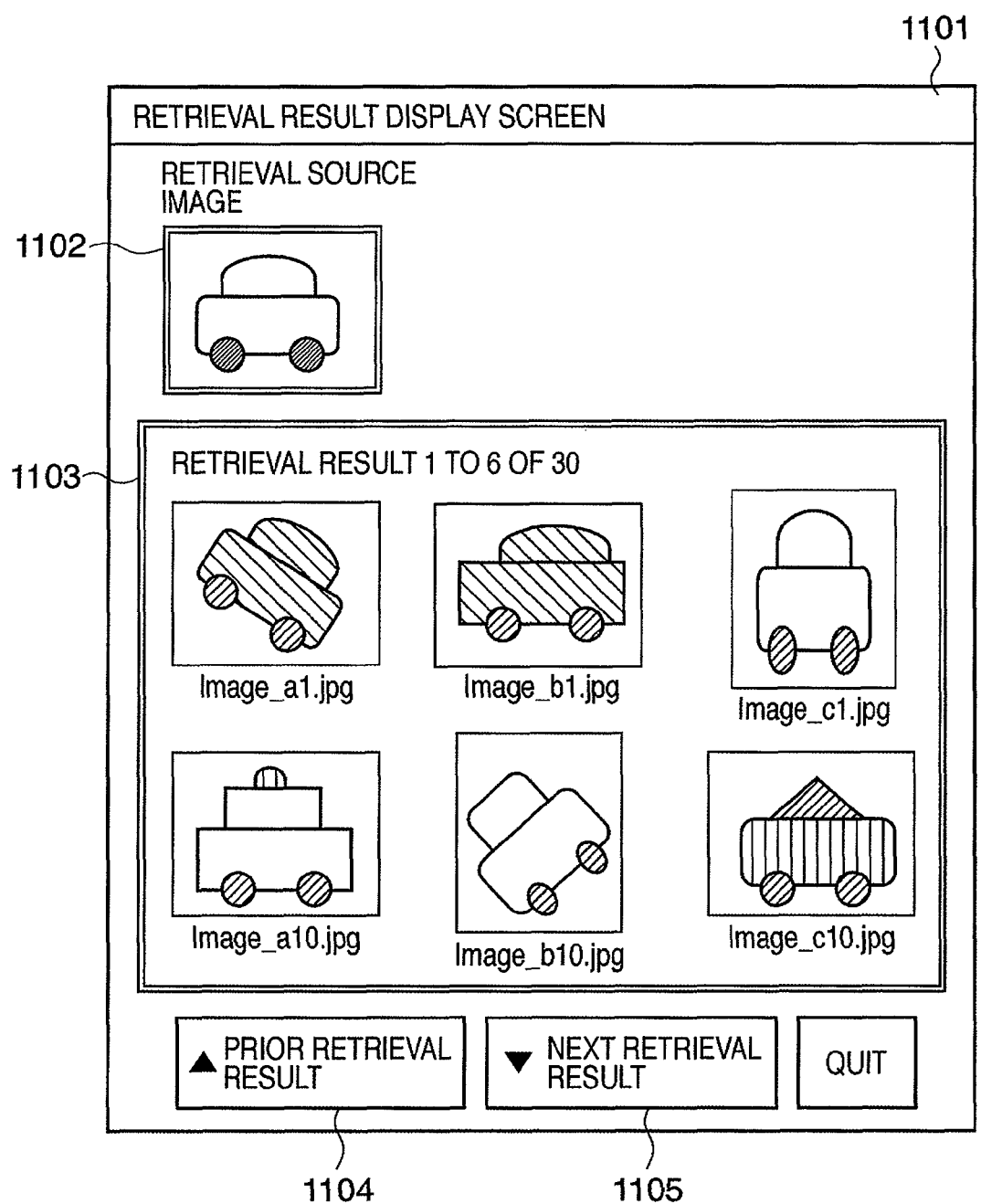
FIG. 11 depicts an example of a retrieval result display screen, which displays a retrieval result list according to the embodiment.

FIG. 11 depicts an instance of a retrieval result display screen, which displays a retrieval result list according to the embodiment. The screen is displayed by the retrieval result display unit 808. Whereas the example that is depicted in FIG. 11 is an instance of a screen of a dedicated application that uses a windowing system, a similar function can be provided by a Web browser, for example.

In FIG. 11, reference numeral 1101 is a title bar, which is a component that performs a display of a title of the screen and an overall operation of the screen, such as a change in a size of the screen. Reference numeral 1102 is a component that displays a thumbnail image of the query image that is the source of the retrieval.

Reference numeral 1103 is a region for displaying the retrieval result, wherein a list including for example a thumbnail of the image that corresponds to the image ID that is obtained as the retrieval result with the image feature comparison unit 806, as well as a file name of the corresponding image is displayed. The thumbnail is created when the image is registered, whereupon the thumbnail thus created is associated with the image ID and registered in the external storage apparatus 106. If the retrieval result is a large number, and they cannot all be displayed on a single screen, a display is performed wherein a series of screens are displayed, with each screen containing a number of the thumbnails that can be displayed on a single screen, in response to a display size thereof. In the present instance, the retrieval results are displayed six at a time.

Reference numeral 1104 is a button for displaying a group of six retrieval result that is prior to the retrieval result currently being displayed, and reference numeral 1105 is a button for displaying a group of six retrieval result that is subsequent to the retrieval result currently being displayed. Whereas in the present instance, the thumbnail and the file name of the image is displayed, detailed information for each respective image, such as the degree of similarity that is derived with the image feature comparison unit 806 or a metadata that is attached to the image could be displayed as an alternative.

It would also be permissible to facilitate selecting one thumbnail from among the thumbnails that are displayed within the region that is depicted by the reference numeral 1103, displaying the image thus selected in a separate screen, and displaying, for example, the metadata that is attached to the image for each respective image as the detailed information As will be understood from the description provided herein, an image retrieval apparatus that employs the feature amount of the image according to the embodiment comprises the following features; when registering and retrieving a large volume of the graphic image to be retrieved, using a size information by region that forms a basis of the feature amount of the image allows forming the first order refinement index with ease that includes a high degree of precision. It is thus possible to implement a high speed process with a low processing load when performing the registration of the target of the retrieval in the circumstance wherein the large volume of the graphic image to be retrieved is registered and retrieved, and to implement a high speed, high precision retrieval process as well.

Other Embodiments

According to another embodiment of the present invention, there is provided a method that, when treating the first order refinement index as the feature amount of the feature point in the immediate vicinity of the feature point that incorporates the feature amount, treats the set thereof as a combination of an array instead.

FIG. 12 depicts an example of a first order refinement index according to this further embodiment.

When a feature point A and a feature point C of a feature point is present within a first order database within an immediate vicinity that is calculated from a scale of a feature amount of a feature point B, two index information items, reference numeral 1203 and 1204, are created. Doing so results in a simple data array, instead of a set thereof, which simplifies a calculation for the index during either or both of the creation or the retrieval thereof.

A redundancy of the index increases, however, which requires a larger storage region for the index information. It is permissible to combine the array only by adjacency when making the combination of the array. While it would be necessary to compare a distance between the feature point when creating and retrieving the index information in such a circumstance, the redundancy of the index does not increase, facilitating an efficient storage.

When three or more of the feature points are present, it would be permissible to use a relative angle therebetween. For instance, a method would be permissible such as a method that creates an array of the feature points in a clockwise direction from a closest feature point. Thus, when treating an information that corresponds to a simple distance, using for example the scale provides the feature amount and the calculation of the degree of similarity with robustness with regard to enlargement, reduction, or rotation upon the image that is targeted for retrieval, and therefore, it would be suitable to use a structure that incorporates the robustness that is similar to the first order refinement.

Whereas a variety of techniques would be conceivable as the method of creating and using the first order refinement index, it would be possible to apply any technique that uses the scale, which is the information that relates to the relative size of the region that is the source of the feature point, to perform the calculation thereof.

It is to be understood that the objective of the present invention is achieved by supplying a recording medium whereupon is recorded a program code (software) that implements the function according to the embodiment to either a system or an apparatus, and a computer, i.e., a CPU or an MPU, of the system or the apparatus loading and executing the program code that is stored upon the recording medium.

In such a circumstance, the program code itself that is loaded from a machine-readable recording medium implements the function according to the embodiment, and the recording medium that stores the program code configures the present invention.

It would be possible to employ, for instance, a floppy disk, a hard drive, an optical disc, a magneto-optical disk, a CD-ROM, a CD-R, a magnetic tape, a nonvolatile memory card, or a ROM as the recording medium for supplying the program code.

It is to be understood that the implementation of the function according to the embodiment incorporates the following circumstance, in addition to the circumstance wherein the computer executes the program code loaded thereby: a circumstance wherein an operating system or another software that is running on the computer performs an actual process, in whole or in part, in accordance with a command of the program code, and the function according to the embodiment is implemented thereby.

It is to be understood that the implementation of the function according to the embodiment incorporates the following circumstance: the program code that is loaded from the recording medium is written to a memory that is incorporated into a function expansion board that is built into the computer or into a function expansion unit that is connected to the computer. The CPU or other hardware that is incorporated into the function expansion board or into the function expansion unit thereafter performs the actual process, in whole or in part, in accordance with the command of the program code, and the function according to the embodiment is implemented thereby.

A high speed retrieval and a high speed registration of a image that is targeted for the retrieval thereof is possible by employing retrieval index information that is created in accordance with an information that relates to a local feature point of the image, according to the embodiment described herein.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-130900, filed May 16, 2007, which is hereby incorporated by reference herein in its entirety.

What is claimed is:

1. An image processing apparatus, comprising:
   an extraction unit configured to extract a plurality of feature points by extracting one or more feature points from a group of images including an input image and some of reduced images obtained by reducing the input image,
   a decision unit configured to decide a size of a region associated with a point of the plurality of feature points based on which reduction-ratio image from the group of images the point was extracted from, for each point of the plurality of feature points, and
   a registration unit configured to register a relation between at least one target feature point and the one or more feature points as an index of the input image, if the one or more feature points exist within a region whose size is the decided size of the at least one target feature point,
   wherein the one or more feature points are feature points that have been extracted from both the reduced images with a same reduction ratio as the reduction ratio of the reduced images including the target feature point and from reduced images with a different reduction ratio from the reduced images including the target feature point, and the one or more feature points are registered together as the index of the input image.

2. The image processing apparatus according to claim 1, further comprising an index retrieval unit configured to retrieve an image using said index.

3. The image processing apparatus according to claim 2, further comprising a feature amount retrieval unit, wherein said feature amount retrieval unit is configured to compute a degree of similarity between the input image and an image retrieved by said index retrieval unit, based on a local feature amount of the target feature point.

4. The image processing apparatus according to claim 1, wherein each of the plurality of feature points has image region information comprising a scale.

5. The image processing apparatus according to claim 4, wherein the image region information is information that provides a relative angle with said scale.

6. The image processing apparatus according to claim 1, wherein the registration unit is configured to register the relation between the target feature point and the one or more feature points as combination indexes if the one or more feature points exist in a calculated determined region determined using an image region information of the target feature point.

7. The image processing apparatus according to claim 6, wherein the combination indexes are created based on a relative location relationship among the target feature point and the one or more feature points if the one or more feature points exist in the determined region determined using the image region information of the target feature point.

8. The image processing apparatus according to claim 1,
   wherein a size value included in image region information of each of the plurality of feature points is a scale, the scale denoting a rate of reduction from the input image to a respective reduced image from which a respective feature point is extracted, and
   wherein a determined region is a region of the input image, and the determined region is centered on the target feature point and has a size determined using the scale included in the image region information of the target feature point.

9. The image processing apparatus according to claim 1, wherein image region information of at least one of the one or more feature points registered in relation to the at least one target feature point includes a size value different from the size value of the target feature point.

10. An image processing method executed by an image processing apparatus, comprising:
   extracting a plurality of feature points by extracting one or more feature points from a group of images including an input image and some of reduced images obtained by reducing the input image,
   deciding a size of a region associated with a point of the plurality of feature points based on which reduction-ratio image from the group of images the point was extracted from, for each point of the plurality of feature points, and
   registering a relation between at least one target feature point and the one or more feature points as an index of the input image, if the one or more feature points exist within a region whose size is the decided size of the at least one target feature point,
   wherein the one or more feature points are feature points that have been extracted not only from the reduced images with the same reduction ratio as the reduction ratio of the reduced images including the target feature point but also from reduced images with the different reduction ratio from the reduced images including the target feature point, and the one or more feature points are registered together as the index of the input image, and wherein at least one of the foregoing steps is performed by one or more processing units.

11. The image processing method as claimed in claim 10 further comprising retrieving an image using said index.

12. The image processing method as claimed in claim 10, wherein a size value included in image region information of each of the plurality of feature points is a scale, the scale denoting a rate of reduction from the input image to a respective reduced image from which a respective feature point is extracted, and wherein a determined region is a region of the input image, and the determined region is centered on the target feature point and has a size determined using the scale included in the image region information of the target feature point.

13. The image processing method as claimed in claim 10, wherein image region information of at least one of the one or more feature points registered in relation to the at least one target feature point includes a size value different from the size value of the target feature point.

14. A non-transitory computer-readable storage medium retrievably storing a computer program which when loaded into a computer and executed performs an image processing method, the method comprising:

extracting a plurality of feature points by extracting one or more feature points from a group of images including an input image and some of reduced images obtained by reducing the input image, and deciding a size of a region associated with a point of the plurality of feature points based on which reduction-ratio image from the group of images the point was extracted from, for each point of the plurality of feature points, and registering a relation between at least one target feature point and the one or more feature points as an index of the input image, if the one or more feature points exist within a region whose size is the decided size of the at least one target feature point, wherein the one or more feature points are feature points that have been extracted not only from the reduced images with the same reduction ratio as the reduction ratio of the reduced images including the target feature point but also from reduced images with the different reduction ratio from the reduced images including the target feature point, and the one or more feature points are registered together as the index of the input image.

15. The non-transitory computer-readable storage medium according to claim 14, the method further comprising retrieving an image using said index.

16. The non-transitory computer-readable storage medium according to claim 14, wherein a size value included in image region information of each of the plurality of feature points is a scale, the scale denoting a rate of reduction from the input image to a respective reduced image from which a respective feature point is extracted, and wherein a determined region is a region of the input image, and the determined region is centered on the target feature point and has a size determined using the scale included in the image region information of the target feature point.

17. The non-transitory computer-readable storage medium according to claim 14, wherein image region information of at least one of the one or more feature points registered in relation to the at least one target feature point includes a size value different from the size value of the target feature point.

* * * * *